Figure 1:
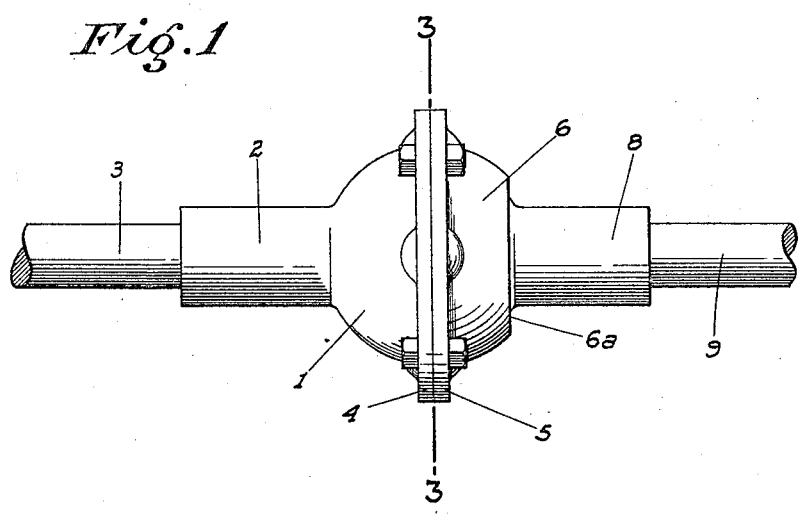

July 31, 1923.　　　　　C. L. BUSHNELL　　　　　1,463,306

UNIVERSAL JOINT

Filed April 15, 1922

INVENTOR.
C. L. Bushnell
BY
ATTORNEY

Patented July 31, 1923.

1,463,306

UNITED STATES PATENT OFFICE.

CHARLES L. BUSHNELL, OF VACAVILLE, CALIFORNIA.

UNIVERSAL JOINT.

Application filed April 15, 1922. Serial No. 553,119.

*To all whom it may concern:*

Be it known that I, CHARLES L. BUSHNELL, a citizen of the United States, residing at Vacaville, county of Solano, State of California, have invented certain new and useful Improvements in Universal Joints; and I do declare the following to be a full, clear, and exact description of the same, reference being had to the accompanying drawings, and to the characters of reference marked thereon, which form a part of this application.

This invention relates to improvements in universal joints such as are commonly used for power-transmitting purposes under certain conditions.

The principal object of my invention is to construct a joint of this character in which ball-bearings not only provide an anti-friction form of journal between the driving and driven members, but are themselves the means by which the one member is driven or rotated with the other.

By means of this construction a smooth running device will be had, in which wear is reduced to a minimum, since there is very little friction; but very little power is absorbed; a tendency to heat up is obviated, a minimum of lubrication is necessary, and what oil is used, will not be thrown off with the operation and rotation of the joint.

A further object of the invention is to produce a simple and inexpensive device and yet one which will be exceedingly effective for the purposes for which it is designed.

These objects I accomplish by means of such structure and relative arrangement of parts as will fully appear by a perusal of the following specification and claims.

In the drawings similar characters of reference indicate corresponding parts in the several views.

Figure 2:
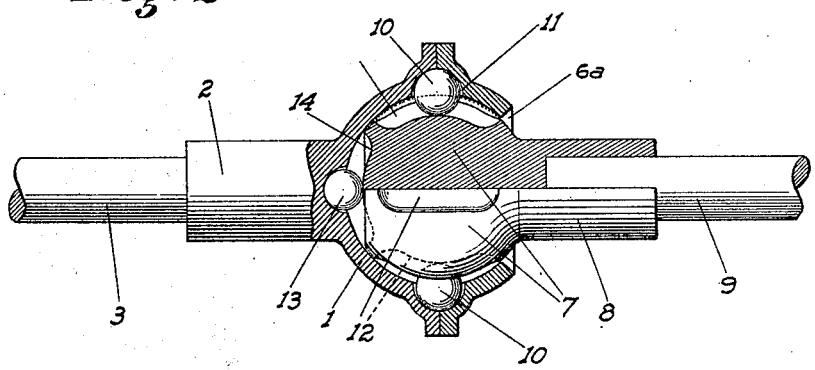
Figure 3:
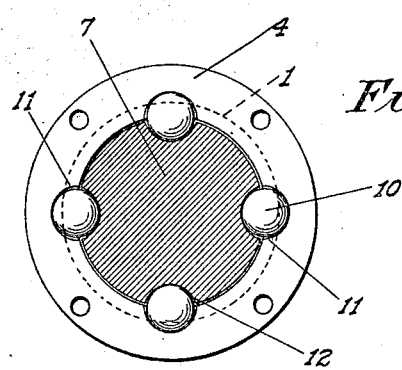

Fig. 1 is a side view of the joint.
Fig. 2 is a sectional elevation thereof, and
Fig. 3 is a cross section on the line 3—3 of Fig. 1.

Referring now more particularly to the characters of reference on the drawings, the numeral 1 denotes a semi-spherical housing having an axially disposed hub 2 into which one end of a shaft 3 is adapted to be fitted.

The end of the housing 1 opposite the hub lies in the diammetrical plane of the housing and at right angles to the line of the shaft and hub, and has on that end a flange 4 abutting against a similar flange 5 on a complementary housing member 6, the outer end of which is open as at 6ª.

Adapted to fit inside the housings, which, since they are made in two parts merely for the purpose of ease of manufacture and assembly may, and will hereinafter be considered as one, is a spherical head 7 preferably having a hub 8 passing freely through the opening in the housing member 2, said hub being adapted to receive one end of a shaft 9. The difference in size of the opening 6ª relative to the hub 8 determines or limits the amount or angle to which the shaft 9 and its connected parts may be turned with respect to the shaft 3 and its connected members.

The head 7 is not actually journaled in the housing, but is suspended therein by means of balls 10 positioned in cups 11 in the housing, these cups being arranged 90° apart, in a line concentric with the axis of the housing and head, and in the diametrical plane of the housing at right angles to the axial line of the shaft 3.

In other words, the center of the balls and cups lie in the plane of the abutting faces of the housing flanges 4 and 5.

These balls also ride in grooves 12 cut in the face of the head 7, these grooves being cut concentric with the head and longitudinally with respect to the axis of the shaft 9.

The balls then if perfectly round as they should be, only contact with the bottom of the grooves at one point each, which points, irrespective of the angle at which the shaft 9 and head 7 may be set relative to the housing, will always lie in a common diametrical line of the head and housing, which line in turn of course intersects the axial lines of the shafts.

It will therefore be evident that the head is free for angular movement with respect to the housing, with the balls as two sets of opposed axial bearings, while at the same time the balls being prevented from movement peripherally of the housings and head, will cause the two to turn together, irrespective of the relative setting of the two members, and failure of the two to so turn could only happen by the shearing through of all four balls.

They cannot pull apart, owing to the enveloping housing, while the thrust is taken by means of a ball 13 seated in the inner end of the housing 1 and also in a circular recess 14 in the adjacent end of the head 7, the bottom of which recess is curved concentric with the head, so that the latter is always free to turn and the ball 13, being immovable and centered in the axial line of the shaft 3, is always in position to directly take the thrust of the head.

This ball thrust bearing however may be omitted if desired, or if the drive is such that any heavy thrust action is absent, in which case the inner end of the head would seat directly against the housing.

Also, it is evident that the same action would be obtained if the ball-cups were in the head and the grooves in the housing.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claim.

Having thus described my invention, what I claim as new and useful and desire to secure by Letters Patent, is:—

A universal joint comprising a primary ball and socket arranged in co-operative position, a secondary socket in the bottom of the primary socket, a single ball seated in said secondary socket, the primary ball having a square head intercepted by a groove shaped to present a surved abutting surface against the secondary ball, the curvature of said surface and secondary ball being the reverse with respect to each other, and ball bearing driving connections between the primary ball and socket.

In testimony whereof I affix my signature.

CHARLES L. BUSHNELL.